United States Patent [19]

Feinberg

[11] Patent Number: 4,881,485
[45] Date of Patent: Nov. 21, 1989

[54] ORNAMENTAL VEHICLE IDENTIFICATION DEVICE

[76] Inventor: Vera L. Feinberg, 1902 S. Ocean Blvd., Apt. 502, Boca Raton, Fla. 33432

[21] Appl. No.: 204,741

[22] Filed: Jun. 10, 1988

[51] Int. Cl.⁴ ............................................. B60Q 1/26
[52] U.S. Cl. .................................. 116/28 R; 116/209; 248/206.2
[58] Field of Search ................ 40/538, 591, 592, 597, 40/306, 307, 593; 116/28 R, 209; 248/206.2; 24/343, 369

[56] References Cited

U.S. PATENT DOCUMENTS

| 2,243,912 | 6/1941 | Legler | 40/597 |
| 2,508,812 | 5/1950 | Burger | 116/28 R |
| 3,036,545 | 5/1962 | Legg | 116/28 R |
| 3,039,615 | 6/1962 | Uihlein et al. | 40/538 |
| 3,070,919 | 1/1963 | Peckham | 46/53 |
| 3,208,173 | 9/1965 | Shank | 40/129 |
| 3,250,241 | 5/1966 | Levy et al. | 116/63 P |
| 3,320,920 | 5/1967 | Lusebrink | 116/28 R |
| 3,363,600 | 1/1968 | Gary | 116/28 R |
| 3,540,406 | 11/1970 | Dexter | 116/28 R |
| 3,762,360 | 10/1973 | Hawes | 116/28 R |
| 4,163,426 | 8/1979 | O'Neill | 116/28 R |
| 4,265,195 | 5/1981 | Higgins | 116/209 |
| 4,348,978 | 9/1982 | Brucato | 116/28 R |
| 4,519,153 | 5/1985 | Moon et al. | 40/591 |
| 4,526,820 | 7/1985 | Haas | 428/31 |
| 4,574,726 | 3/1986 | Sullivan | 116/28 R |
| 4,582,017 | 4/1986 | Ostermiller | 116/28 R |
| 4,590,883 | 5/1986 | Steed et al. | 116/173 |
| 4,624,211 | 11/1986 | Jokel | 116/209 |
| 4,650,147 | 3/1987 | Griffin | 248/539 |
| 4,700,655 | 10/1987 | Kirby | 116/174 |
| 4,759,525 | 7/1988 | Cross et al. | 248/346.1 |

Primary Examiner—William A. Cuchlinski, Jr.
Assistant Examiner—W. Morris Worth
Attorney, Agent, or Firm—Sybil Meloy

[57] ABSTRACT

A combination ornament and identification device for vehicles formed so as to be detachably secured to a surface of a vehicle and containing an attention attracting indicator which comprises a disposable container such as the type used for comestibles from which the comestible has been substantially removed, said device optionally carrying a plurality of streamers. The device includes a mount for attachment to the surface of the vehicle, the attention attracting indicator and fastening element for fastening the disposable container to the mount.

1 Claim, 2 Drawing Sheets

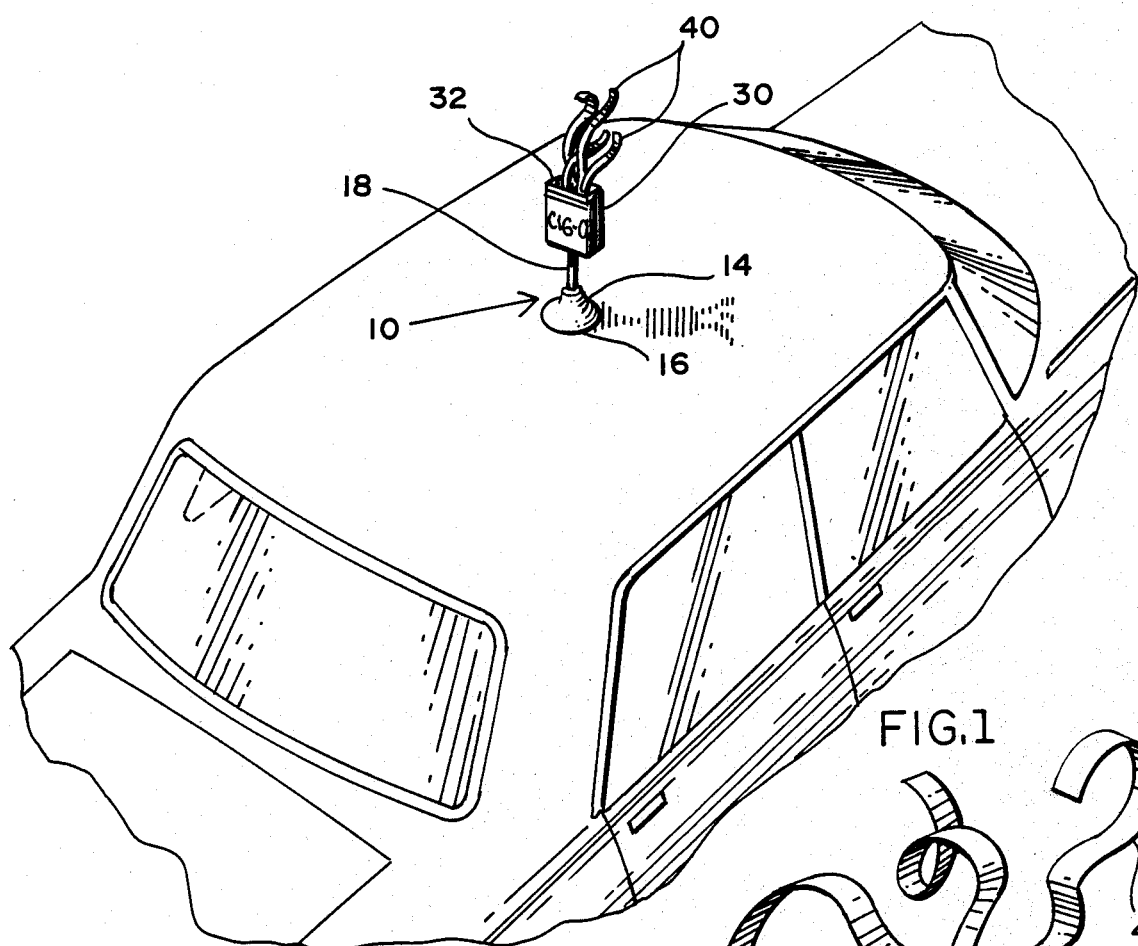
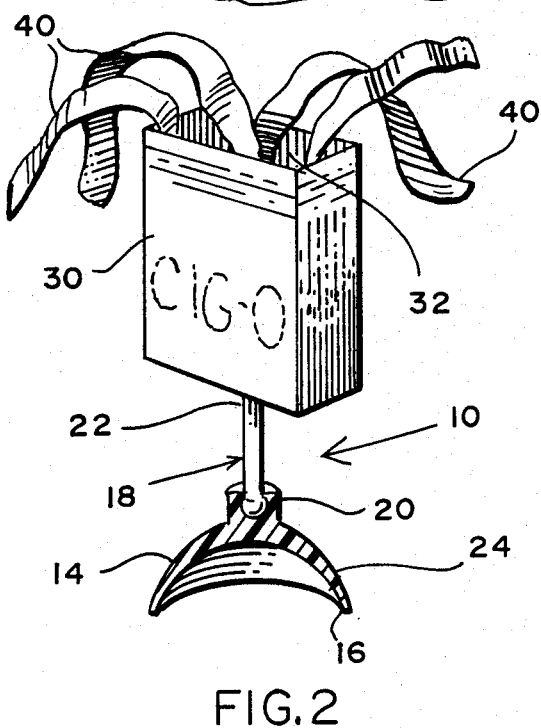
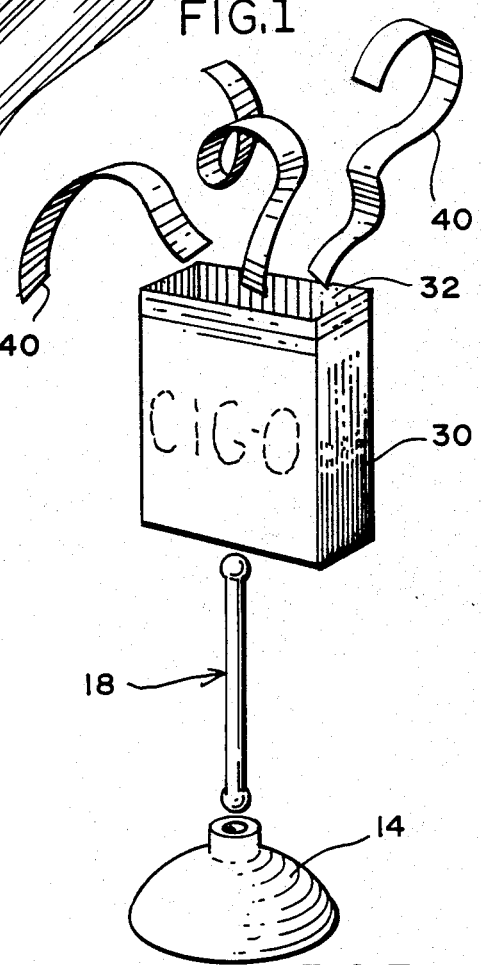
FIG.1
FIG.2
FIG.3

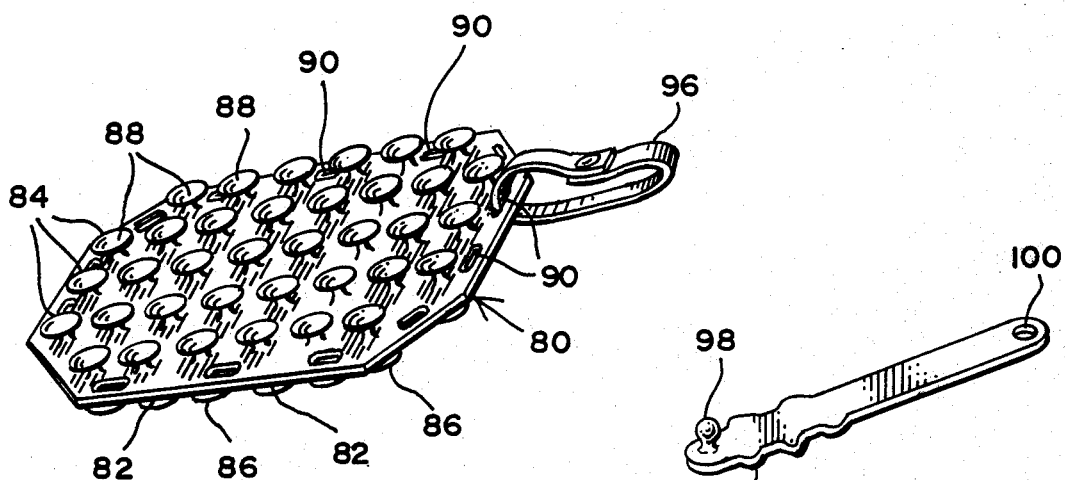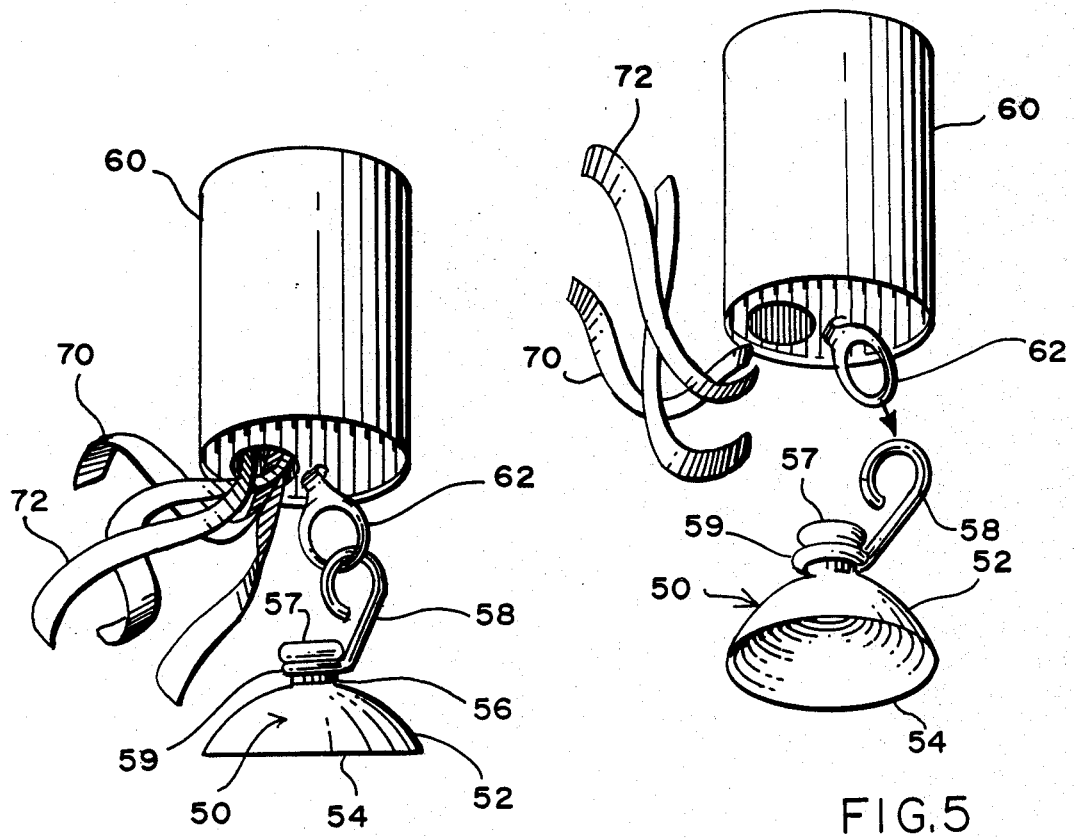

ORNAMENTAL VEHICLE IDENTIFICATION DEVICE

BACKGROUND OF THE INVENTION

This invention relates generally to an ornamental vehicle identification device, more particularly to an ornament constructed of disposable and normally discarded materials defining the identification device.

Ornaments and devices have been attached to cars or other vehicles for purposes of identification. The typical attachment of prior art patents is a flag, although other identifying means have been used such as a reflecting signal, a series of bells, or a sign. Various means of attachment of the device to the vehicle are known, including a window clamp, antenna, suction cups, adhesives and magnets.

The prior art identification means are generally designed specifically for use as a vehicle identification device and intended to be reused repeatedly. As such, the devices are frequently taken by third persons from unattended vehicles. Examples include a solid plastic body or a paper, fabric or plastic flag. Marker ball, flags or ribbons are referred to as being placed on vehicle antennas in U.S. Pat. No. 3,540,406.

The massing of large numbers of vehicles in parking areas, such as athletic stadium, beaches, shopping center parking lots, parking garages, and the like, has seriously aggravated the problem of identifying and locating a given vehicle in a self-parking system, giving rise to the desirability of an identifying device capable of removable attachment to a vehicle, for view by a remote observer. The prior art markers mentioned above are more or less specifically designed and for the purpose and intended for reuse, as distinct from being constructed of inexpensive materials having multiple uses and adapted to be disposed of after each use.

An object of the present invention is to provide a novel and improved vehicle marker that is simple and economical to produce from readily-available materials or objects that otherwise would be disposed of after use.

Another object of this invention is to provide an ornamental device that can be disposed of after each use, and is constructed of materials not suitable for other uses and thus not likely to be taken by third parties.

Still another object of the invention is to provide an ornamental device system that can be comprised of materials used for comestibles, from which the comestibles have been removed and to have such container removably detachable from the attachment means.

A further object of the present invention is to provide an ornament for a vehicle that is simple in structure, and can be readily mounted without tools.

A still further object of the present invention is to provide an ornament that is relatively inexpensive to manufacture and rugged in construction.

Characteristics and advantages of the invention are further sufficiently referred to in connection with the accompanying drawings, which represent three embodiments. After considering these example, skilled persons will understand that variations may be made without departing from the principles disclosed; the employment of other structures, arrangement or modes of operation is contemplated that are properly within the scope of the appended claims.

BRIEF DESCRIPTION OF THE DRAWINGS

Referring more particularly to the accompanying drawings which are for illustrative purposes only, wherein the parts are referenced with like numerals for proper identification:

FIG. 1 is a view showing the ornamental marker in perspective and mounted for use on the roof of a vehicle in readiness for use.

FIG. 2 is a view of the indicator by itself showing the suction cup and ornament in section.

FIG. 3 is an exploded perspective view of the invention.

FIG. 4 is a view of a modified device adapted to hold a soft drink container from which the soft drink has been substantially removed and to which has been added various streamers through the opening adapted for dispensing of the liquid.

FIG. 5 is an exploded perspective view of the modified device.

FIG. 6 is a lateral view of another modified device.

FIG. 7 is an exploded view of the fastening means for the device of FIG. 6.

DESCRIPTION OF THE PREFERRED EMBODIMENT

Referring to the embodiment as illustrated in FIGS. 1, 2 and 3, there is shown an ornamental device, generally indicated at 10, which is adapted to be removably mounted to the outer surface of a vehicle 12, most desirably on the roof of the vehicle. The present device is an identification device because the ornament can be readily seen when positioned on the roof or adjacent surface. When parked in a large, crowded parking lot, cars and other vehicles are often difficult to locate. Thus, an identifying ornamental device attached to the roof or adjacent surface of the vehicle allows one to readily find his vehicle.

The ornamental marker device as disclosed herein comprises a suction cup 14 whose bottom edge 16 is adapted to be reasonably applied to a portion of the vehicle, preferably the crest of the roof. The bottom edge 16 can, if desired, be provided with a liquid or solid adhesive to prevent detachment. In lieu of a suction cup, the device can be provided with various means known for attachment of an object to a vehicle, including but not limited to an adhesive or a magnet. When a suction cup is used as the mount for attachment to the surface of a vehicle, it can either be a single suction cup as described, or it can be a plurality of suction cups which can provide for suction attachment on one or both sides, as shown in FIGS. 6 and 7.

To the suction cup for attachment to the surface of the vehicle is provided a shaft 18 for fastening the disposable container 30 to the mount. The lower end portion of the shaft 18 is anchored in the reinforced neck or crown portion 20 of the mount 14 on the domed surface 24 of the suction cup. As an alternative to the shaft 18 for fastening the disposable container 30 to the mount, there can be employed a second adhesive layer, additional suction cups, as shown in FIG. 6 for engaging the disposable container 30 or the hooks shown in FIGS. 4 and 5.

The upper end portion 22 of shaft 18 is adapted to engage the disposable container 30. The container 30 is composed of a frangible material. As shown in FIGS. 1 through 3, the container 30 is a cigarette package from which the cigarettes have been removed. The cigarette package is mounted on the shaft 18 by forcing the upper portion of the shaft 18 into the bottom of the container. As an alternative to the cigarette package 30, the container can be any type of disposable, optionally frangible, semi-rigid container of the type used for comestibles from which any comestible has been substantially removed. The term "comestible" used here means anything that is normally eaten, drunk or smoked by a person. The term "disposable container" used here refers to any container that is used for such comestibles which is composed of paper, plastic or metal and is normally discarded after use rather than reused.

The attention attracting indicator is comprised of the disposable container for comestibles from which the comestible has been substantially removed shown in the FIG. 1 as empty cigarette box 30, which container can optionally carry a plurality of streamers 40 which extend from the open end of the container 32 outwardly. Alternatively, a soft drink can from which the contents have been used can be placed on the shaft 18.

In the practice of the invention the mount for attachment to the surface of the vehicle 12 is carried with the driver of the vehicle. Upon parking, the driver takes an empty container and optionally a plurality of streamers, places the streamers in the empty container for comestibles and affixes the container 30 to the mount 14, then attaches the Suction cup 14 to the vehicle 12. The plurality of streamers 40 can be manually placed in the container. Alternatively, the steamers could be attached to one end of a wand, the other end of which is inserted into the container. After returning to his vehicle, the driver can discard the container, retaining the mount 14.

Referring now to the embodiment illustrated in FIG. 4, there is shown a mount 50 shown as a rubber or equivalent suction cup 52, the bottom edge 54 of the suction cup 52 which is adapted to be applied to the exterior of a vehicle. At the upper end of the mount 50 is collar 56. To collar 56 there is fastened a hook 58 having a tail 59 which surrounds the collar portion 56 of the mount 50 and extends to a hook 58 which is adapted to engage an eye shown as ring 62. In the embodiment shown in FIG. 4 the eye is the pull ring 62 of a soft drink container 60. The opening in the soft drink can can be provided with a plurality of streamers 70 and 72. As can be seen in FIG. 4, the streamers can be affixed to the container 60 by insertion into the opening in container 60 shown in the drawing in FIG. 5.

The streamers 70 and 72 of FIGS. 4 and 5 and streamers 40 of FIGS. 1 through 3 can be comprised of conventional materials used for streamers such as paper and foil. The streamers can be purchased commercially in rolls or spools. The rolls or spools can be colored in multi-colors, striped or dotted, checked, silver, gold or other colors as to metal foil, emblemed, flowered, designed, whatever the user desires. A new spool can be used each time the device is used as a marker.

Again in practice, when the owner desires to park the vehicle, he can apply the mount 50 to the vehicle, attach the soft drink container which has been emptied of its contents to the hook via the eye on the "pull ring" and apply the streamer to the can.

The vehicle driver can then easily locate his vehicle by not only the container used for the marker but by the various colored disposable materials. Any combination of colors can be used and any type of container can be used as long as means for attachment to the mount are available.

With this colorful easy to spot mount perched atop the vehicle, it can be spotted readily by the vehicle owner.

FIG. 6 is an alternative mount for the device. FIG. 6 has a plastic base 80 having opposed surfaces 82 and 84 from which depend a plurality of suction cups 82 and 84. The suction surfaces 86 and 88 of cups 86 and 88 face in opposite directions,. The base also contains a plurality of apertures 90, through which a fastening means 96 can be attached. Fastening means 96 is shown in FIG. 7 as a child's barrette having a tongue 98 for contact with eye 100. The fastening means can be opened and closed for attachment to base 80 and the container to be attached thereby.

It is apparent that various changes may be made in the form, construction and arrangement of the parts of the invention, without departing from the spirit and scope thereof or sacrificing its material advantages, the arrangement hereinbefore described being merely by way of example and not being intended to restrict the specific form shown or use as mentioned.

What is claimed is:

1. A ornamental identification device for vehicles, wherein the device is adapted to be secured to a surface of the vehicle, which comprises, in combination:

a removable mount for attachment to the surface of said vehicle;

a frangible, semi-rigid, disposable container for comestibles from which any comestible has been substantially removed through an opening therein; and having an eye; formed by a ring attached to said container a plurality of streamers inserted into said opening; and means for attachment of said mount said container comprising a hook having a tail attached to said mount, said hook being adapted to engage said eye of the comestible container.

* * * * *